US012703153B2

(12) United States Patent
Sivaprasad

(10) Patent No.: US 12,703,153 B2
(45) Date of Patent: Aug. 11, 2026

(54) THREE DIMENSIONAL PRINTING SYSTEM WITH VERTICALLY TRANSLATING BUILD PLANE

(71) Applicant: 3D Systems, Inc., Rock Hill, SC (US)

(72) Inventor: Akarsh Sivaprasad, Nashua, NH (US)

(73) Assignee: 3D SYSTEMS, INC., Rock Hill, SC (US)

( * ) Notice: Subject to any disclaimer, the term of this patent is extended or adjusted under 35 U.S.C. 154(b) by 100 days.

(21) Appl. No.: 18/800,589

(22) Filed: Aug. 12, 2024

(65) Prior Publication Data

US 2025/0058526 A1 Feb. 20, 2025

Related U.S. Application Data

(60) Provisional application No. 63/519,592, filed on Aug. 15, 2023.

(51) Int. Cl.

| | |
|---|---|
| ***B29C 64/393*** | (2017.01) |
| ***B29C 64/129*** | (2017.01) |
| ***B29C 64/232*** | (2017.01) |
| ***B29C 64/277*** | (2017.01) |
| ***B33Y 10/00*** | (2015.01) |
| ***B33Y 30/00*** | (2015.01) |
| ***B33Y 50/02*** | (2015.01) |

(52) U.S. Cl.

CPC .......... *B29C 64/393* (2017.08); *B29C 64/129* (2017.08); *B29C 64/232* (2017.08); *B33Y 10/00* (2014.12); *B33Y 30/00* (2014.12); *B33Y 50/02* (2014.12); *B29C 64/277* (2017.08)

(58) Field of Classification Search

CPC ... B29C 64/393; B29C 64/129; B29C 64/232; B29C 64/277; B29C 64/255; B33Y 10/00; B33Y 30/00; B33Y 50/02

See application file for complete search history.

(56) References Cited

U.S. PATENT DOCUMENTS

| | | | |
|---|---|---|---|
| 10,259,171 | B2 | 4/2019 | Robeson et al. |
| 10,434,706 | B2 | 10/2019 | Robeson et al. |
| RE49,180 | E | 8/2022 | Robeson et al. |

(Continued)

OTHER PUBLICATIONS

PCT International Search Report for International Search Authority for PCT/US2024/041900 mailed Nov. 28, 2024 (6 pages).

(Continued)

*Primary Examiner* — Inja Song

(57) ABSTRACT

A three-dimensional printing system includes a build vessel, a build platen, a transparent fluid, a photocurable fluid, a first fluid source, a light engine, and a controller. The transparent fluid is vertically bounded between a transparent plate and a build plane. The photocurable fluid vertically bounded between the build plane and an upper fluid surface. The controller is configured to: (1) operate the first fluid source to lower the build plane with an average velocity V by extraction of the transparent fluid from the build vessel; (2) concurrent with operating the first fluid source, operate the light engine to lower a focal plane of the light engine at the average velocity V; and (3) concurrent with operating the first fluid source, operate the light engine to selectively irradiate the build plane and to accrete the 3D article in a downward direction by the average velocity V.

12 Claims, 6 Drawing Sheets

(56) References Cited

U.S. PATENT DOCUMENTS

| | | | | |
|---|---|---|---|---|
| 2015/0165678 | A1* | 6/2015 | Ding | B33Y 10/00 425/150 |
| 2020/0108549 | A1* | 4/2020 | John | B33Y 30/00 |
| 2020/0324466 | A1 | 10/2020 | Nishida et al. | |
| 2021/0114288 | A1* | 4/2021 | Mirkin | B29C 64/264 |
| 2022/0097304 | A1* | 3/2022 | Ong | B29C 64/255 |
| 2022/0193988 | A1* | 6/2022 | Walker | B29C 64/255 |
| 2023/0128967 | A1* | 4/2023 | Zhao | B29C 64/264 264/401 |
| 2023/0219288 | A1* | 7/2023 | Hsueh | B29C 64/264 264/401 |

OTHER PUBLICATIONS

PCT Written Opinion of the International Search Authority for PCT/US2024/041900 mailed Nov. 28, 2024 (9 pages).

* cited by examiner

THREE DIMENSIONAL PRINTING SYSTEM WITH VERTICALLY TRANSLATING BUILD PLANE

CROSS-REFERENCE TO RELATED APPLICATIONS

This non-provisional patent application claims priority to U.S. Provisional Application Ser. No. 63/519,592, Entitled "THREE DIMENSIONAL PRINTING SYSTEM WITH VERTICALLY TRANSLATING BUILD PLANE" by Akarsh Sivaprasad, filed on Aug. 15, 2023, incorporated herein by reference under the benefit of U.S.C. 119(e).

FIELD OF THE INVENTION

The present disclosure concerns an apparatus and method for manufacturing three-dimensional (3D) articles from photocurable liquids in a layer-by-layer manner. More particularly, the present disclosure concerns a way of accommodating an accumulation or accretion of build layers without mechanically moving a 3D article and without adhesion issues with a transparent plate.

BACKGROUND

Three dimensional (3D) printers are in rapidly increasing use for manufacturing customized 3D articles. A class of 3D printers includes stereolithography printers having a general principle of operation including the selective curing and hardening of radiation curable (i.e., photocurable) liquids. The 3D articles are formed in a layer-by-layer manner. In one "subclass" of stereolithography printers, a fluid reservoir that contains the photocurable liquid has a transparent sheet or plate on a lower side. A light engine, such as a projector, selectively projects pixelated radiation up through the transparent plate to a "build plane" just above the transparent plate. As individual layers are formed, a 3D article is raised by one layer thickness. Challenges include fragility of the layers and a possibility of the layers adhering to the transparent plate.

SUMMARY

According to the disclosure, a three dimensional (3D) printing system is configured to manufacture a 3D article. The 3D printing system includes a build vessel, a build platen, a transparent fluid, a photocurable fluid, a first fluid source, a light engine, and a controller. The build vessel is configured to contain a fluid above the transparent plate. The build vessel includes a first fluid port above a second fluid port. The build platen has a lower surface in facing relation with the transparent plate. The transparent fluid is contained within the build vessel and vertically bounded between the transparent plate and a build plane. The transparent fluid has a first specific gravity. The photocurable fluid is contained within the build vessel and vertically bounded between the build plane and an upper fluid surface which is above the lower surface of the build platen. The photocurable resin has a second specific gravity that is less than the first specific gravity. The first fluid source is coupled to the first fluid port and configured to control a vertical position of the build plane by extracting or injecting the transparent fluid through the first fluid port. The light engine is configured to transmit pixelated radiation to the build plane. The controller is configured to: (1) operate the first fluid source to lower the build plane with an average velocity V by extraction of the transparent fluid from the build vessel; (2) concurrent with operating the first fluid source, operate the light engine to lower a focal plane of the light engine at the average velocity V; and (3) concurrent with operating the first fluid source, operate the light engine to selectively irradiate the build plane and to accrete the 3D article in a downward direction by the average velocity V.

In one implementation, the 3D printing system includes a second fluid source coupled to the second fluid port. The controller is configured to operate the second fluid source concurrently with the first fluid source to inject the photocurable resin above the build plane.

In another implementation, the first fluid source includes a first fluid tank containing the transparent fluid and a pump that operates between the first fluid tank and the first fluid port.

In yet another implementation, the controller operates the first fluid source to lower the build plane in a series of vertical steps individually having an average vertical step height of h and with the steps spaced temporally with an average time duration of T, the velocity V equals h/T.

In a further implementation, the controller operates the first fluid source to lower the build plane continuously with the velocity V.

In a yet further implementation, the light engine includes a projection unit coupled to a vertical movement mechanism, the controller lowers the focal plane by operating the vertical movement mechanism to lower the projection unit.

DETAILED DESCRIPTION OF THE PREFERRED EMBODIMENTS

Figure 1:
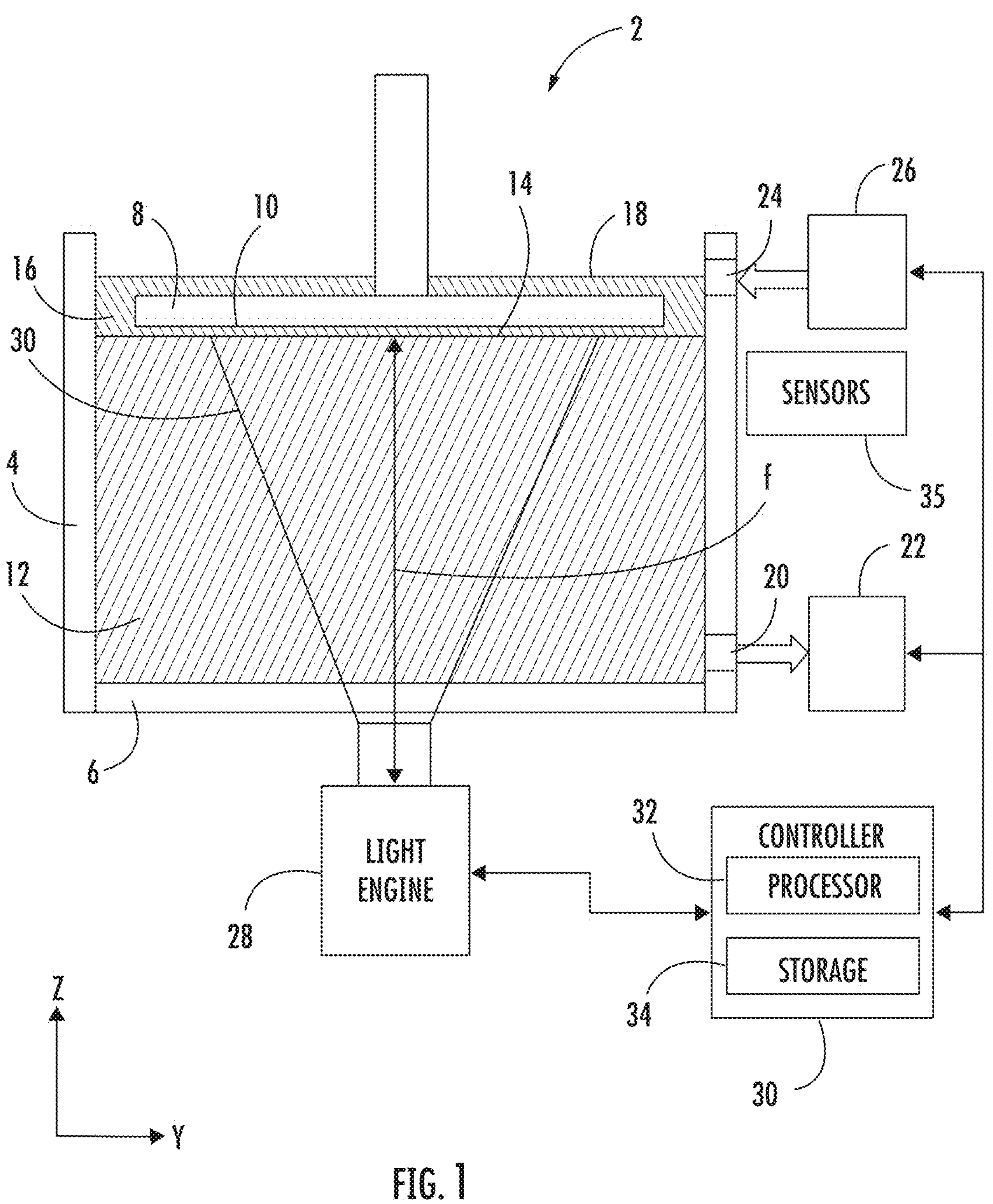
FIG. 1 is a schematic diagram of an embodiment of a three-dimensional (3D) printing system in an initial state just before fabricating a 3D article.

FIG. 1 is an isometric drawing depicting an embodiment of three-dimensional (3D) printing system 2. In describing 3D system 2, mutually perpendicular axes X, Y, and Z will be used. Axes X and Y are generally horizontal lateral axes. Axis Z is a vertical axis that is generally aligned with a gravitational reference. In using the word "generally" it is implied that a limitation that is "generally" true is by design but to within manufacturing tolerances. Additionally angular axes theta-X, theta-Y, and theta-Z are rotations about the X, Y, and Z axes respectively.

3D printing system 2 includes a build vessel 4 configured to contain a liquid fluid above a transparent plate 6. The transparent plate 6 is "transparent" or optically clear with respect to transmission of blue, violet, or ultraviolet radiation that can have a wavelength within a range of 100 to 500 nanometers (nm). Transparent plate 6 can be formed of glass, quartz, or polymers that provide desired rigidity and transmissivity. The transparent plate 6 defines a lower portion 6 of the build vessel 4.

A build platen 8 is fixedly supported toward an upper end of the build vessel 4. The build platen 8 has a lower surface 10 in facing relation with the transparent plate 6.

The build vessel 4 contains a transparent fluid 12 that is vertically bounded between the transparent plate 6 and a build plane 14. The transparent fluid 12 is optically transparent in the same way that the transparent plate 6 is optically transparent. The transparent fluid 6 has a first specific gravity which is a dimensionless quantity defined as a mass density of the transparent fluid 6 divided by a mass density of water which is about one gram per cubic centimeter.

In some embodiments, the transparent fluid is a transparent fluorinated synthetic oil. The transparent fluid can be a perfluoropolyether (PFPE), a perfluoroalkyl ether (PFAE), or a perfluoropolyalkylether (PFPAE) to name some particular examples. On a weight basis, some embodiments of the transparent fluid can have a molecular structure that is 21-22% carbon, 9-10% oxygen, and about 68-70% fluorine. Such a transparent fluid can have a specific gravity in a range of about 1.7 to 2.0 depending upon temperature and exact molecular composition. Such materials have been used in the aerospace industry as lubricants for decades. Other transparent fluids 12 are possible and a selection depends in part upon a choice of photocurable fluid 16.

The build vessel 4 contains a photocurable fluid or resin 16 that is above the transparent fluid 12 and vertically bounded between the build plane 14 and an upper surface 18. The photocurable fluid 16 has a second specific gravity that is of lower magnitude than the first specific gravity. Also, the photocurable fluid 16 is immiscible with the transparent fluid 12 so that the build plane 14 between fluids 14 and 16 is well defined. The upper surface 18 of the photocurable fluid 16 is above the lower surface 10 of the build platen before a build starts.

In some embodiments, the photocurable fluid 16 is a photocurable hydrogel. Such a photocurable fluid would contain water, a monomer, a radiation-activated catalyst or photoinitiator, and other components. Such materials are known in the art for bioinks. Other photocurable fluids 16 can be used. Generally, a photocurable fluid 16 at minimum includes a liquid vehicle (such as water and/or a solvent), at least one monomer, and a radiation activated catalyst. The catalyst is sensitive to radiation having a wavelength within a range from 100-500 nm. The wavelength can include one or more discrete wavelengths or a wavelength distribution. In response to receiving the radiation, the catalyst causes the monomer to polymerize and/or crosslink which in turn hardens the photocurable fluid 16. It is important that the photocurable fluid 16 is immiscible with the transparent fluid 12. Also, it is important that the photocurable fluid 16 has a lower specific gravity than the transparent fluid 12.

In a particular embodiment, the transparent fluid 12 is a nonpolar oil with specific gravity in a range of 1.7 to 2.0. The photocurable fluid 16 is an aqueous/hydrogel liquid that is polar and has a specific gravity that is well under 1.5. Nonpolar and polar liquids are immiscible and the specific gravity difference drives separation to clearly define the build plane 14. Other combinations of liquids are possible.

The build vessel 4 includes a first fluid port 20 that is coupled to a first fluid source 22. The first fluid source 22 is configured to extract or inject the transparent fluid 12 through the fluid port 20. The first fluid source 20 includes a fluid tank or reservoir containing the transparent fluid 12. The first fluid source 20 includes a pump that operates between the fluid tank and the first fluid port 20. In a one embodiment, the pump is a peristaltic pump that operates by rolling or moving an actuator over a flexible tube. In other embodiments other pumps can be used such as positive displacement pumps, bellows pumps, or syringe pumps, to name some examples. The first fluid port 20 is preferably located near the bottom of the build vessel 4 to allow a maximum vertical range for the build plane 14 which in turn maximizes a maximum vertical dimension of a 3D article to be manufactured.

The build vessel 4 includes a second fluid port 24 that is coupled to a second fluid source 26. A structure of the second fluid source 26 can be similar to that of the first fluid source 22 and includes a fluid tank or reservoir containing the photocurable fluid 16. The second fluid source 26 also includes a pump that operates between the fluid tank and the second fluid port 24. The second fluid port 24 is vertically located above the lower surface 10 of the build platen 8.

A light engine 28 is positioned below the build vessel 4. Light engine 28 is configured to project pixelated radiation 30 to the build plane 14. The light engine 28 has a focal length f that is generally equal to a vertical distance between internal optics of the light engine 28 and the build plane 14. Thus, a focal plane of the light engine 28 is at or adjacent to the build plane 14. In some embodiments, the focal plane and the build plane 14 are coincident. In other embodiments, the focal plane may be above or below the build plane to alter surface properties of the 3D article to be manufactured.

In one embodiment, the light engine 28 includes a projection unit coupled to a vertical movement mechanism. The vertical movement mechanism enables the projection unit to be vertically positioned so that the focal plane of the projection unit can have a constant vertical position relative to the build plane 14.

In another embodiment, the light engine 28 has variable focus optics that allows the focal plane to be vertically positioned by varying a focal length. The variable focus optics again allow the focal plane to have a constant vertical position relative to the build plane 14. In yet another embodiment, the light engine 28 includes both a vertical movement mechanism and variable focus optics. The vertical movement mechanism and variable focus optics cooperate to vertically position the focal plane.

In one embodiment, the projection unit of light engine 28 includes, inter alia, a light source, a spatial light modulator, and projection optics. The light source emits radiation in the blue to ultraviolet range or with a wavelength between 100 and 500 nm. The light source can be an arc lamp or an LED (light emitting diode) array to name two examples. The spatial light modulator can include a micromirror array with micromirrors that can be individually controlled to reflect a pixel of light either through the projection optics or to a light trap. Such projection units are used and known within the realm of stereolithography. In alternative embodiments, the projection unit can use other spatial light modulators that are based upon other principles such as liquid crystal arrays in series with polarization filter which are also known in the art.

In one embodiment, the vertical movement mechanism includes a motorized ball bearing screw mechanism or otherwise referred to as a ball screw mechanism. A ball screw mechanism includes a vertical screw shaft that passes through a ball nut. The ball nut contains recirculating steel balls and translates vertically. The vertical screw shaft has helical channels that engage the recirculating balls. The projection module is coupled to the ball nut. A motor is coupled to the vertical screw shaft and is configured to selectively rotate the vertical screw shaft. As the vertical screw shaft rotates, the action of the vertical screw shaft upon the ball nut translates the elevator upward and downward depending on a direction of rotation. Such translation mechanisms are known in the art for precision positioning along vertical, horizontal, and oblique axes. Other embodiments are possible such as a lead screw and nut system or a rack and pinion mechanism or a motorized belt/pulley system and are all known in the art for linearly translating components along various axes.

System 2 can include one or more sensors 35 configured to output information indicative of the state of system 2 including, inter alia, a vertical location of build plane 14, a vertical location of upper surface 18, a temperature of transparent fluid 12, a temperature of photocurable fluid 16, or other parameters. Sensors for sensing vertical locations can include optical and/or ultrasonic sensors. Sensors for sensing temperature can include thermocouples and/or other devices. Such sensors 35 are known in the art.

A controller 30 is controllably coupled to, inter alia, the first fluid source 22, the second source 26, the light engine 28, and sensor(s) 35. The controller 30 includes a processor 32 coupled to a non-volatile or non-transient storage device 34. The storage device 34 stores software instructions that, when executed by the processor 32, control various portions of the 3D printing system 2. The controller 30 can be a single module co-located with the 3D printing system 2 and/or include modules, computers, and/or servers that are spaced or remote from printing system 2. Controllers including processors and storage subsystems are well known in the art for control of electromechanical systems.

Figure 2:
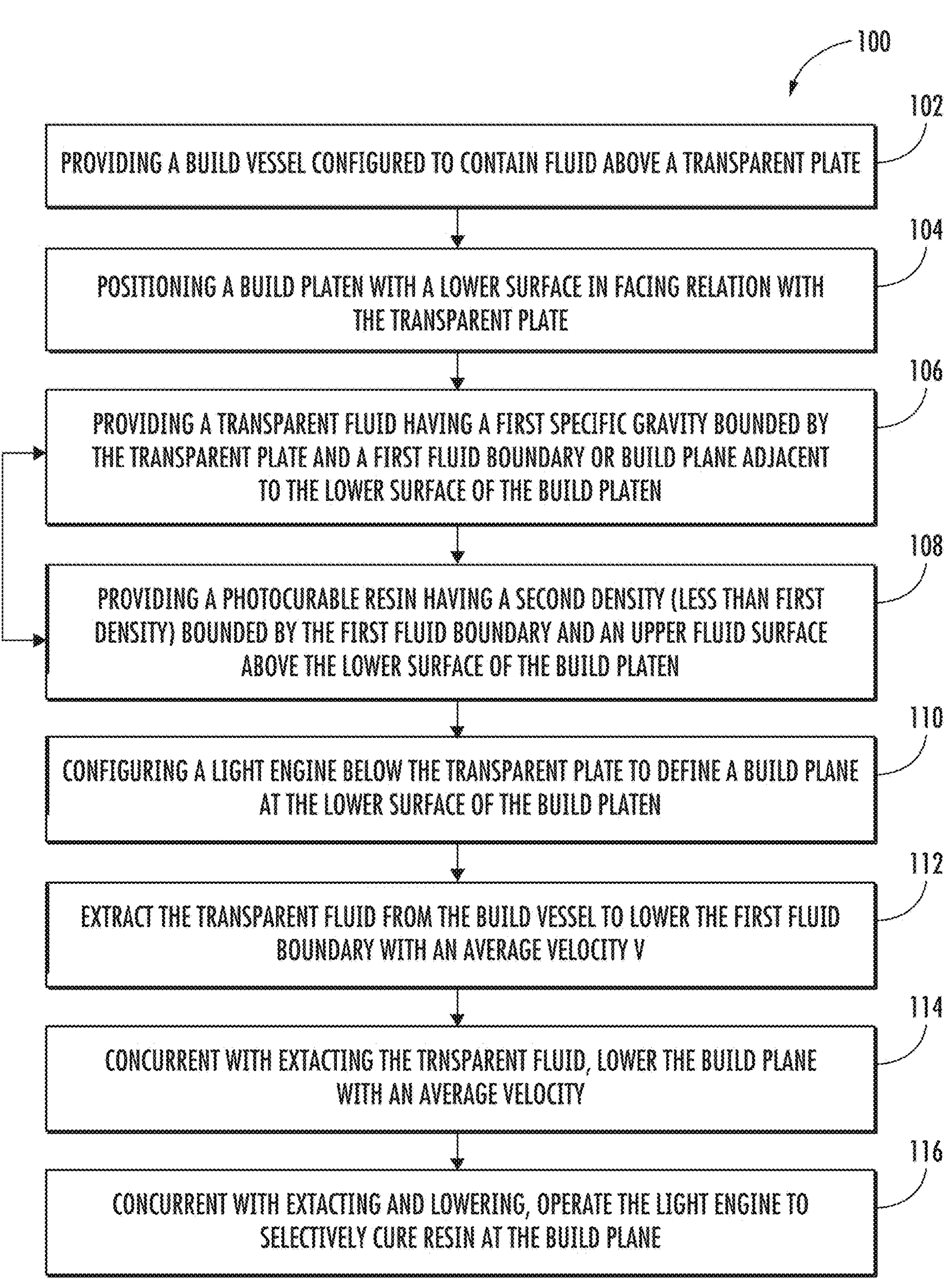
FIG. 2 is a flowchart depicting a method of manufacturing a three-dimensional (3D) article.

FIG. 2 is a flowchart depicting a method 100 of manufacturing a 3D article using the 3D printing system 2 of FIG. 1. Some of the steps of method 100 can be performed automatically by controller 30 whereas some can be performed manually and/or in an assembly factory. In some embodiments, steps 106-116 are performed automatically by controller 30 operating various components of the 3D printing system 2.

According to 102, a build vessel 4 is provided for containing a liquid fluid above a transparent plate 6. According to 104, a build platen 8 is positioned with a lower surface 10 in facing relation with the transparent plate 6.

According to 106, the transparent fluid 12 is dispensed or pumped into the build vessel 4. The transparent fluid 12 may be initially filled to a level that is substantially below the build plane 14 to allow effective filling with the photocurable fluid 16. This is why FIG. 2 shows some "back and forth" between steps 106 and 108.

According to 108, the photocurable liquid 16 is dispensed or pumped into the build vessel 4 above the transparent liquid 12. The process can then loop back to step 106 in which the transparent fluid 12 is added until the build plane 14—at the interface between fluids 12 and 16—is adjacent to or proximate to the lower surface 10 of the build platen 8. This is illustrated in FIG. 1 in which about one layer thickness of the photocurable liquid 16 is between the transparent liquid 12 and the lower surface 10.

According to 110, the light engine 28 is configured below the transparent plate 6 such that a focal plane of the light engine 28 is properly positioned or coincident with the build plane 14. This configuration includes operating one or more of the vertical movement mechanism and the variable focus optics one or both of which are part of light engine 28.

According to 112, the first fluid source 22 is operated to extract transparent fluid 12 from the build vessel 4 to cause the build plane 14 to begin translating downward with an average velocity V. The motion can be continuous or in a series of steps—the latter meaning starting and stopping for each layer of photocurable liquid 16 to be selectively hardened by light engine 28.

According to 114—concurrent with 112, the light engine 28 is operated to lower the focal plane of light engine 28 with velocity V. Thus, 114 assures that the focal plane remains properly positioned relative to the build plane 14. Being properly positioned may mean vertically coincident or it may mean offset by a selected amount.

According to 116—concurrent with 112 and 114, operate the light engine 28 to selectively irradiate, cure, and harden the photocurable liquid 16 at the build plane 14. Thus, steps 112-116 progressively form the 3D article with a lower face of the 3D article forming in a downward direction with an average velocity V. Concurrent with 112-116, the second fluid source 26 can be operated to maintain a certain upper surface 18 of the photocurable liquid 16 by injecting the photocurable liquid 16 into the build vessel 4.

Figure 3:
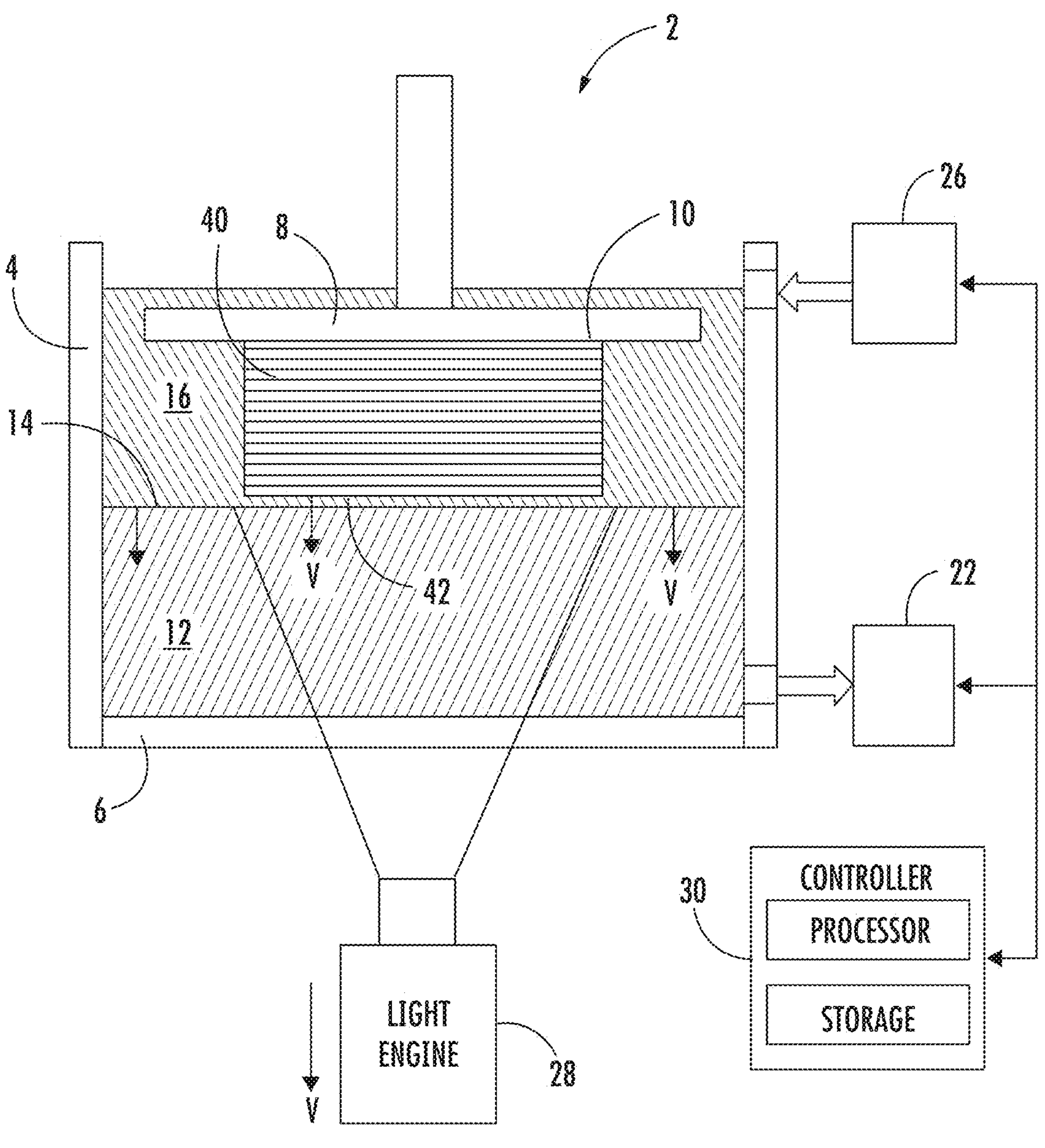
FIG. 3 is a schematic diagram of an embodiment of a three-dimensional (3D) printing system during manufacture of a 3D article.
Figure 4:
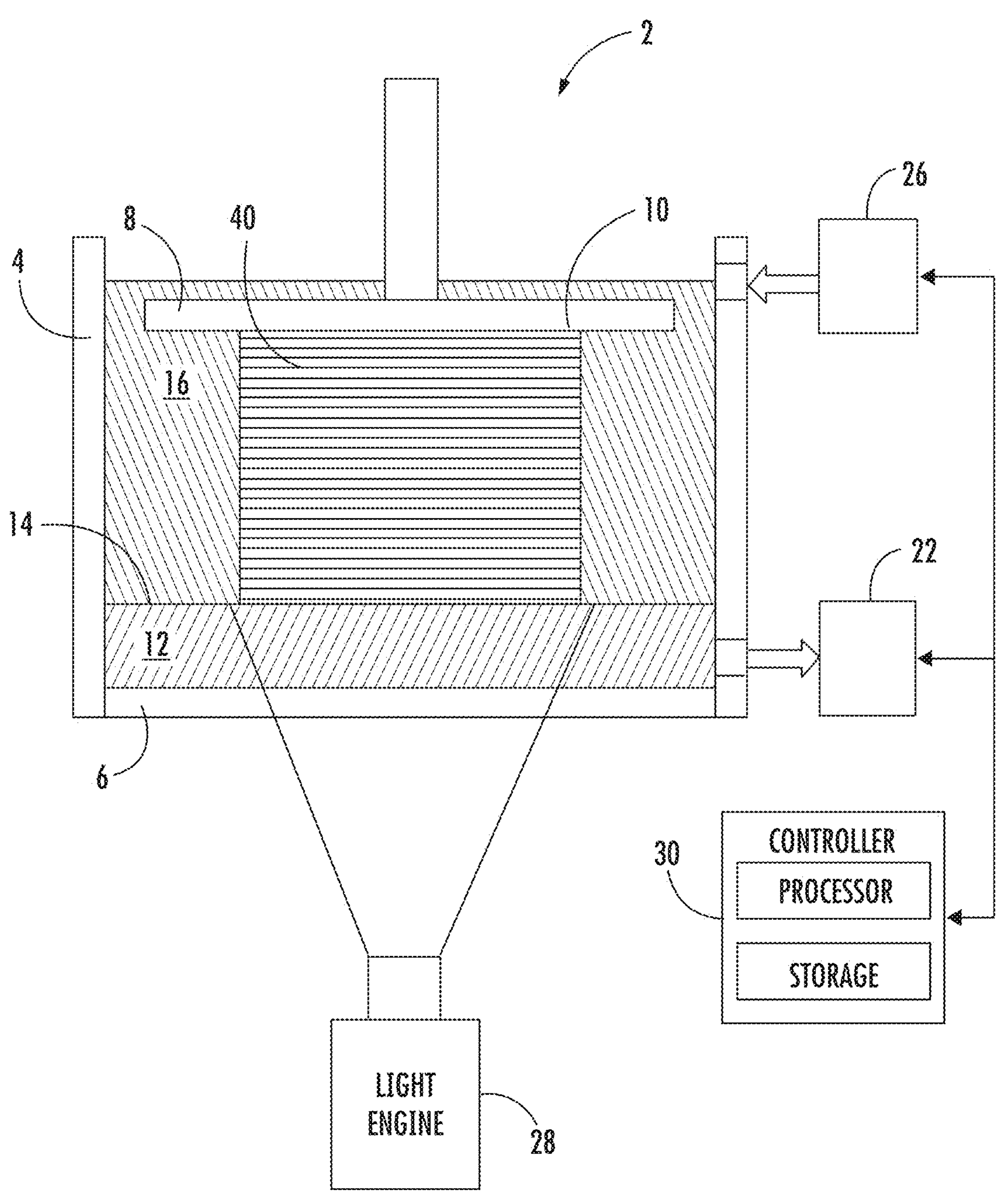
FIG. 4 is a schematic diagram of a 3D printing system after fabricating a 3D article.

Whereas FIG. 1 illustrates the beginning of method 100, FIGS. 3 and 4 illustrate intermediate and final states of method 100 respectively during the formation of the 3D article 40. In the illustrated embodiment of FIG. 3, the build plane 14, the focal plane of light engine 28, and the lower face 42 of 3D article are all moving downward (−Z) with an average velocity V. Since the build platen 8 is fixed, the lower face 42 of 3D article 40 is moving downward by accretion of layers onto the 3D article 40. Thus, lower face 42 is a lower surface of a layer formed on top of a previous lower face 42.

FIG. 3 also illustrates arrows indicating fluid flow through the fluid ports 20 and 24. The first fluid source 22 is pumping the transparent liquid 12 out of the build vessel 4 in order to lower the build plane 14 at the average velocity V. At the same time, the second fluid source 26 is pumping the photocurable fluid 16 into the vessel 4. FIG. 4 depicts a completed 3D article 40.

Figure 5:
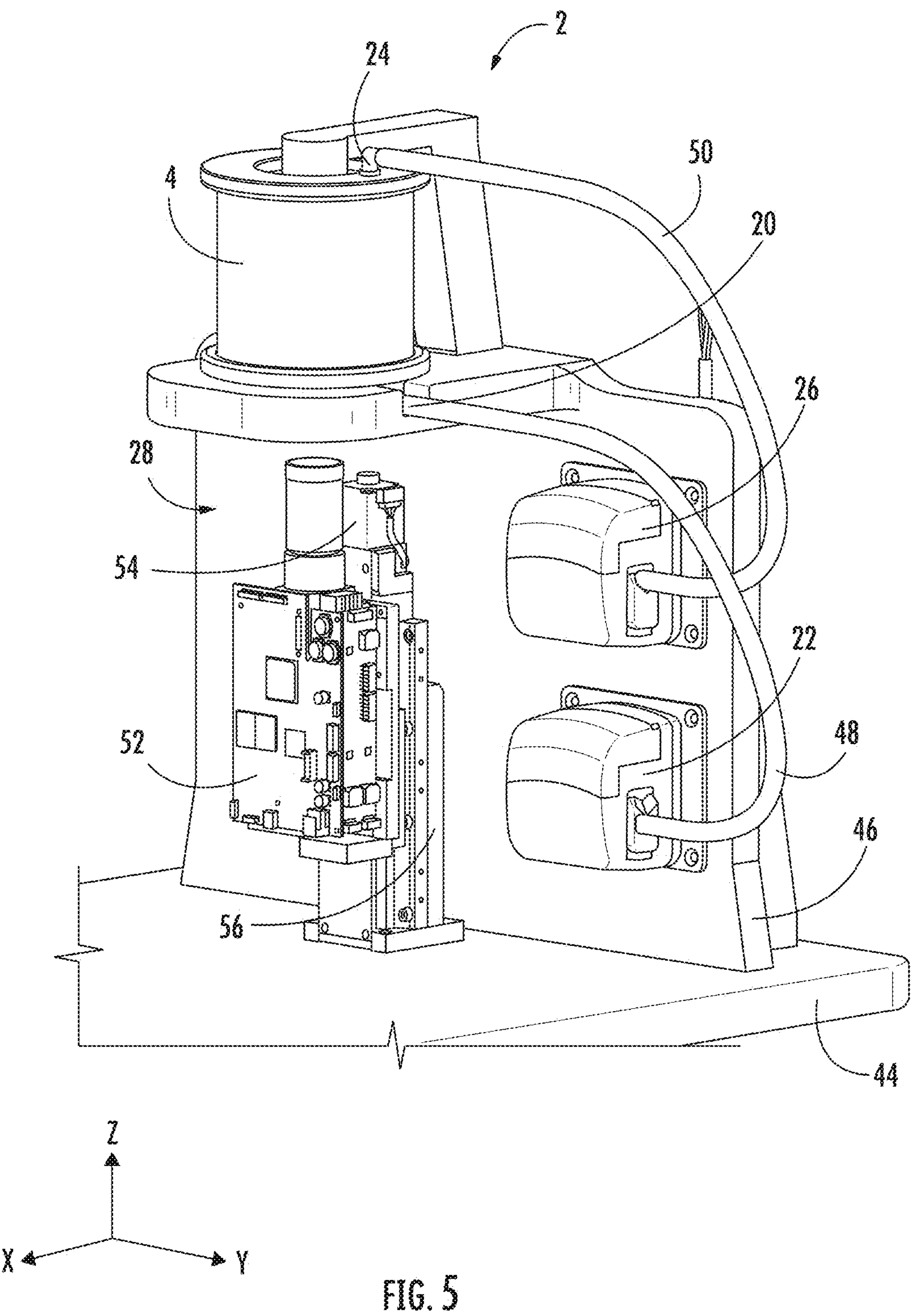
FIG. 5 is an isometric drawing of a 3D printing system.

FIG. 5 is an isometric drawing of an embodiment of the 3D printing system 2. Relative to earlier figures, like element numbers indicate like elements. Elements of the 3D printing system are mounted to a stable base 44. A vertical support 46 is coupled to the stable base 44.

Figure 6:
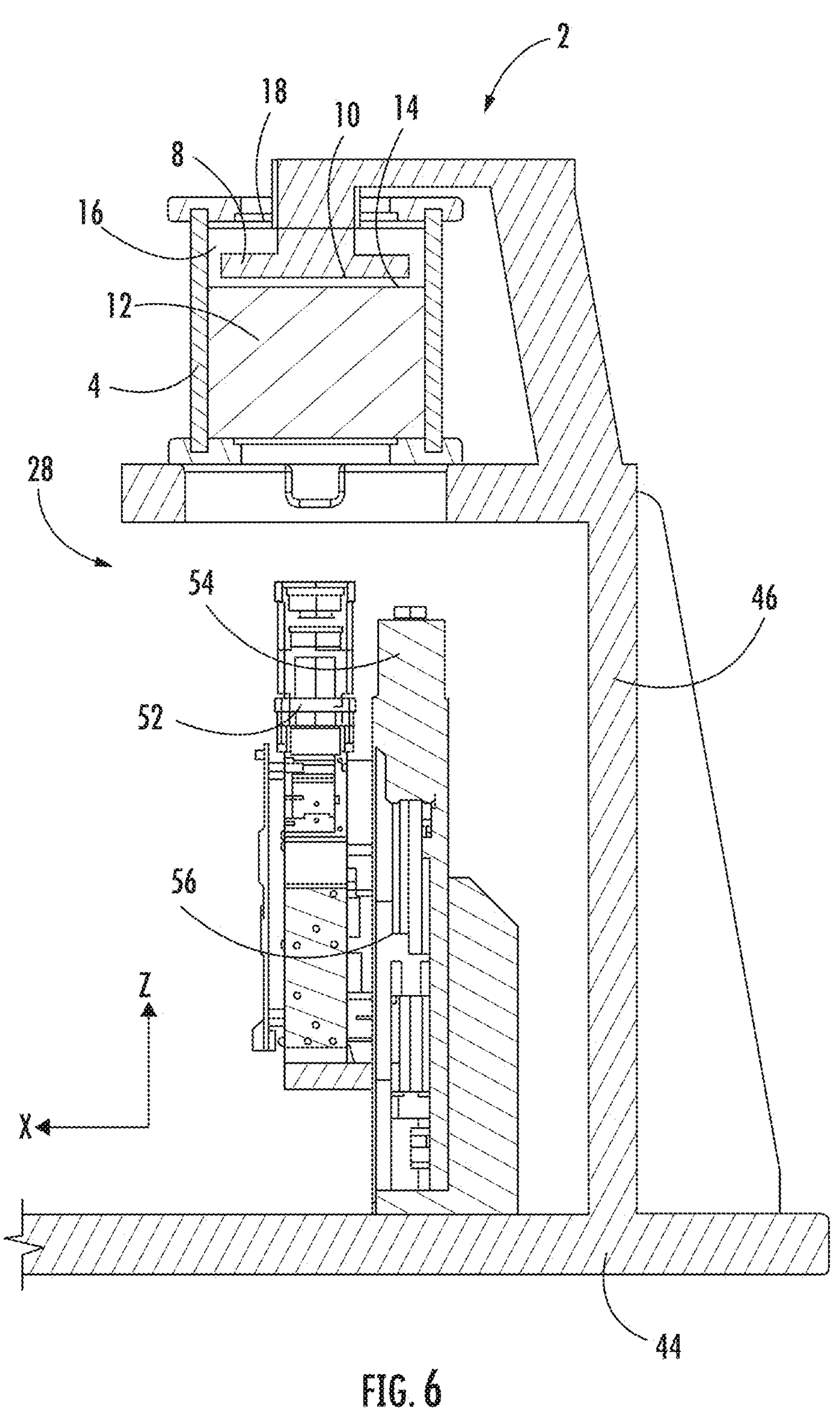
FIG. 6 is a cross-sectional drawing of a 3D printing system.

FIG. 6 is a side cross-sectional view of the embodiment of FIG. 5. The build vessel 4 and build platen 8 are rigidly coupled to the vertical support 46 so that they are fixed relation to each other. The first fluid source 22 and second fluid source 26 are also mounted to the vertical support. In the illustrated embodiment, the first fluid source 22 and second fluid source 26 include peristaltic pumps that are coupled to the first 20 and second 24 fluid ports by flexible tubes 48 and 50 respectively.

The light engine 28 includes a projection unit 52 coupled to vertical movement mechanism 54. A linear bearing 56 couples the projection unit 52 to the vertical support 46. As illustrated, the vertical movement mechanism 54 includes a motor coupled to a lead screw. The lead screw is threaded through a nut that is in turn coupled to the projection unit 52. The controller 30 raises and lowers the projection unit 52 by operating the motor to rotate the lead screw.

The specific embodiments and applications thereof described above are for illustrative purposes only and do not preclude modifications and variations encompassed by the scope of the following claims.

What is claimed:

1. A three-dimensional (3D) printing system configured to print a 3D article comprising:

a build vessel configured to contain fluid above a transparent plate, the build vessel including first and second fluid ports, the second fluid port is above the first fluid port;

a build platen having a lower surface in facing relation with the transparent plate;

a transparent fluid contained within the build vessel and vertically bounded between the transparent plate and a build plane, the transparent fluid having a first specific gravity;

a photocurable fluid contained within the build vessel and vertically bounded between the build plane and an upper fluid surface which is above the lower surface of the build platen, the photocurable fluid having a second specific gravity that is less than the first specific gravity;

a first fluid source coupled to the first fluid port and configured to control a vertical position of the build plane by extracting or injecting the transparent fluid through the first fluid port;

a light engine configured to transmit pixelated radiation to the build plane; and a controller configured to:

operate the first fluid source to lower the build plane with an average velocity V by extraction of the transparent fluid from the build vessel;

concurrent with operating the first fluid source, operate the light engine to lower a focal plane of the light engine at the average velocity V; and concurrent with operating the first fluid source, operate the light engine to selectively irradiate the build plane and to accrete the 3D article in a downward direction by the average velocity V.

2. The 3D printing system of claim 1 further comprising a second fluid source coupled to the second fluid port, the controller is configured to operate the second fluid source concurrently with operating the first fluid source the photocurable fluid above the build plane.

3. The 3D printing system of claim 1, wherein the first fluid source includes a first fluid tank containing the transparent fluid and a pump that operates between the first fluid tank and the first fluid port.

4. The 3D printing system of claim 1, wherein the controller operates the first fluid source to lower the build plane in a series of vertical steps individually having an average vertical step height of h and with the steps spaced temporally with an average time duration of T, the velocity V equals h/T.

5. The 3D printing system of claim 1, wherein the controller operates the first fluid source to lower the build plane continuously with the velocity V.

6. The 3D printing system of claim 1, wherein the light engine includes a projection unit coupled to a vertical movement mechanism, the controller lowers the focal plane by operating the vertical movement mechanism to lower the projection unit.

7. A method of manufacturing a three-dimensional (3D) article comprising:

providing a build vessel configured to contain fluid above a transparent plate, the build vessel including first and second fluid ports, the second fluid port is above the first fluid port;

providing a build platen having a lower surface in facing relation with the transparent plate;

providing a transparent fluid contained within the build vessel and vertically bounded between the transparent plate and a build plane, the transparent fluid having a first specific gravity;

providing a photocurable fluid contained within the build vessel and vertically bounded between the build plane and an upper fluid surface which is above the lower surface of the build platen, the photocurable fluid having a second specific gravity that is lesser than the first specific gravity;

providing a first fluid source coupled to the first fluid port and configured to control a vertical position of the build plane by extracting or injecting the transparent fluid through the first fluid port;

providing a light engine configured to transmit pixelated radiation to the build plane;

operating the first fluid source to lower the build plane with an average velocity V by extraction of the transparent fluid from the build vessel;

concurrent with operating the first fluid source, operating the light engine to lower a focal plane of the light engine at the average velocity V; and concurrent with operating the first fluid source, operating the light engine to selectively irradiate the build plane and to accrete the 3D article in a downward direction by the average velocity V.

8. The method of claim 7 further including:

providing a second fluid source coupled to the second fluid port; and operating the second fluid source concurrently with operating the first fluid source to inject the photocurable fluid above the build plane.

9. The method of claim 7, wherein the first fluid source includes a first fluid tank containing the transparent fluid and a pump that operates between the first fluid tank and the first fluid port, operating the first fluid source includes operating the pump.

10. The method of claim 7, wherein the build plane is lowered in a series of vertical steps individually having an average vertical step height of h and with the steps spaced temporally with an average time duration of T, the velocity V equals h/T.

11. The method of claim 7, wherein the build plane is lowered continuously with the velocity V.

12. The method of claim 7, wherein the light engine includes a projection unit coupled to a vertical movement mechanism, lowering the focal plane includes operating the vertical movement mechanism to lower the projection unit.

* * * * *